(12) United States Patent
Marabi et al.

(10) Patent No.: US 8,802,172 B2
(45) Date of Patent: Aug. 12, 2014

(54) METHOD FOR PREPARING A BEVERAGE FROM A BEVERAGE POWDER AND APPARATUS FOR IMPLEMENTING THE METHOD

(75) Inventors: Alejandro Marabi, Lausanne (CH); Jean-Marc Coudene, Saint Legier la Chiesaz (CH); Gerhard Niederreiter, Savigny (CH); Johanna Claude, Lausanne (CH)

(73) Assignee: Nestec S.A., Vevey (CH)

( * ) Notice: Subject to any disclaimer, the term of this patent is extended or adjusted under 35 U.S.C. 154(b) by 58 days.

(21) Appl. No.: 13/500,395

(22) PCT Filed: Sep. 30, 2010

(86) PCT No.: PCT/EP2010/064577
§ 371 (c)(1),
(2), (4) Date: Apr. 5, 2012

(87) PCT Pub. No.: WO2011/042356
PCT Pub. Date: Apr. 14, 2011

(65) Prior Publication Data
US 2012/0201937 A1    Aug. 9, 2012

(30) Foreign Application Priority Data
Oct. 5, 2009   (EP) ..................................... 09172196

(51) Int. Cl.
*A23L 1/164*   (2006.01)
*A47J 31/02*   (2006.01)

(52) U.S. Cl.
CPC ........................................ *A47J 31/02* (2013.01)
USPC .......................... 426/241; 426/506; 99/289 R

(58) Field of Classification Search
CPC ........... A23G 1/02; A23G 1/04; A23G 1/047; A47J 31/02

USPC .................................. 426/241, 506; 99/289 R
See application file for complete search history.

(56) References Cited

U.S. PATENT DOCUMENTS

| | | | |
|---|---|---|---|
| 5,358,725 A | | 10/1994 | Izumitani et al. |
| 5,994,677 A | * | 11/1999 | Åkerlind ........................ 219/502 |
| 2008/0032030 A1 | | 2/2008 | Babaev |

FOREIGN PATENT DOCUMENTS

| | | | |
|---|---|---|---|
| CA | 1234877 | 4/1988 | |
| EP | 0740904 | 11/1996 | |
| JP | 60-176571 | * 9/1985 | ............... A23L 1/40 |
| JP | H01184594 | 7/1989 | |
| JP | H02219563 | 9/1990 | |
| JP | H06-14716 | 2/1994 | |
| JP | 20001155238 | 6/2001 | |
| JP | 2002538580 | 11/2002 | |
| JP | 2008507999 | 3/2008 | |
| JP | 2008526218 | 7/2008 | |
| JP | 2009007067 | 1/2009 | |
| WO | WO2006010404 | 2/2006 | |
| WO | WO2009059938 | 5/2009 | |
| WO | WO2009092628 | 7/2009 | |

OTHER PUBLICATIONS

Search Report for International Application No. PCT/US2010/064577 mailed Jan. 17, 2011.
Written Opinion for International Application No. PCT/US2010/064577 mailed Jan. 17, 2011.

* cited by examiner

*Primary Examiner* — Rena L Dye
*Assistant Examiner* — Chaim Smith
(74) *Attorney, Agent, or Firm* — K&L Gates LLP

(57) ABSTRACT

The invention concerns a method for preparing a beverage from a soluble beverage powder comprising the steps of: —metering a dose of the soluble beverage powder, —heating the soluble beverage powder dose, —diluting the heated soluble beverage powder dose with a diluent.

6 Claims, No Drawings

METHOD FOR PREPARING A BEVERAGE FROM A BEVERAGE POWDER AND APPARATUS FOR IMPLEMENTING THE METHOD

CROSS REFERENCE TO RELATED APPLICATIONS

The present application is a National Stage of International Application No. PCT/EP2010/064577, filed on Sep. 30, 2010, which claims priority to European Patent Application No. 09172196.9, filed on Oct. 5, 2009, the entire contents of which are being incorporated herein by reference.

The present invention relates to the production of beverages by dissolution of soluble powder beverage ingredients.

A beverage dispenser device usually prepares a beverage from one or more soluble beverage ingredients by having the ingredients interact with a liquid. In some types of beverage dispensers, powders are mixed with a liquid, such as water for example, in order to prepare a beverage. Thereby, in particular in the field of beverages such as coffee, tea, chocolate, malted beverages, soup, infant formula, cappuccino, powders are used for the preparation of the beverage. The known beverage dispensers therefore comprise a dosing device for dosing a predefined amount of soluble powder stored in a storage chamber into a mixing chamber or into a dedicated vessel. Therein, liquid can be introduced in order to interact with the soluble powder and hence, form a food composition.

However, the existing beverage dispenser devices which make use of the above outlined principle suffer the inconvenience that the beverage soluble powder is not always fully dissolved, particularly when a cold beverage is prepared by dissolving the powder with a cold diluent. Thus, residua of the undispersed or undissolved powder are present in the prepared beverage; this leads to a non-uniform and thus to a non-inviting appearance of the prepared beverage. Besides, since the whole dose of soluble powder is not totally dissolved, the final beverage does not present the expected taste; actually there exists a fine tuning between the diluent volume and the powder quantity to get the best final beverage. If the dissolution is not efficient, the final beverage won't reach the expected taste. Undissolved material can also lead to a feeling of sandiness in the mouth and/or result in leftovers at the bottom of the cup when the drink is finished, with the consequent negative impact on the consumer.

Solutions have been proposed to add additives in the beverage soluble powders compositions to improve their dissolution but these additives may have an impact on the beverages taste or increase the costs of production of the existing powders. For example, WO 2007/088195 proposed to add flowing agents to food powders in order to improve their cold dissolution characteristics.

EP 740 904 describes a method to improve the wettability of agglomerated cocoa and sugar containing powders which consists in exposing the powders to electromagnetic radiation. Yet, improving the wettability is not sufficient to get a good dissolution of the powders at the moment of preparation of the beverages.

The present invention aims at solving the problem of improving the solubility of soluble beverage powders without using additive components in the beverage powders.

The present invention aims at solving the problem of shortening the dissolution time of soluble beverage powders and the reconstitution time of the beverages.

The present invention aims at solving the problem of improving the reconstitution of soluble beverage powders when they are dissolved with a cold diluent.

According to a first aspect, the invention concerns a method for preparing a beverage from a soluble beverage powder comprising the steps of:
  metering a dose of the soluble beverage powder,
  heating the soluble beverage powder dose,
  diluting the heated soluble beverage powder dose with a diluent.

The method of the present invention is based on the principle of applying heat to the powder that is currently dosed and is going to be subsequently dissolved. It has been actually observed that the fact of applying heat to the powder at an earlier step, for example during the industrial process preparation of the powder, does not provide the dissolution improvement effect that can be observed in the present invention. Then, the heated beverage powder dose is generally dissolved less than 5 minutes after it has been heated. According to the preferred embodiment of the present invention, the heated beverage powder dose is dissolved immediately after it has been heated. The amount of heat provided to the beverage powder dose depends on the nature of the powder, particularly on the water content and water activity of the powder. Depending on said nature, the amount of heat is preferably inferior to the heat amount that let undesired reactions take place like e.g., stickiness, Maillard reaction, browning, crystallization, decomposition, or that changes the physical nature of the powder like fat melting and leaching out of the powder matrix. The time for heating or the heating energy can therefore be defined according to the nature and composition of each powder.

The heating step of the method of the present invention can be implemented with any source of heating. Yet, due to the fact that the method is preferably implemented in a beverage dispenser and then that the beverage preparation process must be short, the beverage powder dose is preferably heated by applying an electromagnetic energy in the microwave range.

The method of the present invention can be implemented with a hot or a cold diluent. Yet, improved dissolution and/or reconstitution results have particularly been noticed for the preparation of cold beverages with a cold diluent. In particular, cold beverage can be prepared with a diluent presenting a temperature comprised between 0° C. and ambient temperature, more specifically between 2 and 15° C., and even more preferably between 4 and 10° C.

The method of the present invention can be implemented with any type of soluble beverage powder like coffee, tea, chocolate, malted beverages, soup, infant formula, milk, creamer and cappuccino. Particular improvements have been noticed with the method of the present invention in the case of milk based powder, creamer and chocolate based powders: actually these products are usually difficult to dissolve at a cold temperature.

In the present application the term "powder" covers any free flowing solid product like dust, fine grains, loose particles, agglomerates, granules. The term also covers pelletized soluble products or soluble tablets.

According to a simple embodiment, the soluble beverage powder can be dosed in a container and the soluble beverage powder dose can then be heated inside the container. The diluent is introduced in the container after this heating step.

According to a first mode of this embodiment, the container can be a cup or a mixing chamber. This mode can be applied in beverage dispensing machines where the powder is either dosed in the final cup or in a mixing chamber before being dissolved with the diluent.

According to a second mode of this embodiment, the container can be a capsule. This mode can be applied in beverage dispensing machines where the powder that is pre-dosed inside the capsule is then dissolved by direct injection of the diluent in the capsule.

According to a second aspect, the invention concerns a soluble beverage production device for preparing a beverage from a beverage powder comprising:
powder supplying means,
diluent supply means,
a heating device configured to supply heat to a dose of soluble beverage powder.

The heating device can be any means able to heat a dose of powder before it is mixed with a diluent. Conduction, convection or radiation heating means can be used. Depending on the type of heating means, the powder can be simultaneously agitated to homogenize the heating through the whole powder dose. Preferably the heating device is a magnetron configured to supply electromagnetic energy in the microwave range.

According to a first embodiment, the powder supplying means can comprise powder storing means and powder dosing means. This first embodiment particularly concerns beverage dispensing machines where the powder is either dosed in the final cup or in a mixing chamber before being dissolved with the diluent.

The powder supply means can be any known device for supplying beverage powders like a multidose container of which outlet is directed to the powder dosing means. This multidose container can be a tank or vessel, a pouch, a sachet, a tin or canister . . . either disposable or non-disposable. The powder dosing means can also be of any known type like a screw, an auger, a barrel, a sliding chamber, a rotary pierced disc, . . . for delivering a dose of powder to a part of the beverage production device where the powder dose can be heated.

According to a first mode, the powder dosing means can deliver the powder directly in the cup of the customer and the heating device is configured to supply heat to the cup.

According to a second mode, the powder dosing means can deliver the powder in a mixing chamber and the heating device is configured to supply heat to the mixing chamber.

According to a third mode, the beverage production device can comprise a heating passage configured to supply the powder and arranged to intersect a wave-guide to heat the powder when electromagnetic energy is applied within the wave-guide.

According to a second embodiment, the beverage production device can comprise a capsule receiving compartment and the heating device can be configured to supply heat to said compartment.

According to a preferred embodiment the heating device can also be configured to supply heat to the diluent. Then the same heating device means can be used for heating both the diluent and the powder which optimizes the foot print of the beverage production device. In this embodiment the heating device is preferably a magnetron configured to supply electromagnetic energy in the microwave range.

The method and the device of the present invention enable the preparation of beverages by dissolution of a powder in a shorter time than in the prior art.

This advantage is particularly important for the preparation of beverages in dispensing machines since customers do not accept to wait a long time for the preparation of the beverage. Moreover the powder is totally dissolved and no lumps stay in the final cup.

EXAMPLES

Example 1

Different beverages have been prepared according to the prior art by dosing an amount of soluble powder and diluting the dosed powder with 200 ml of water presenting a temperature of 5° C. The dissolution was made by agitation with a magnetic stirrer during 600 seconds. The amount of powder was defined in order to get a tasty beverage in accordance with the 200 ml of water (normally 10 to 20 g of powder).

Then different beverages have been prepared according to the invention by reproducing the same conditions as for the beverages prepared according to the prior art except that the dosed amount of powder was submitted to a microwave treatment just before dissolution. The microwave treatment was made with a Panasonic oven operating at 1400 Watt.

The different soluble powders presented the following compositions:
Chocolate powder 1
malt extract
milk powder
maltodextrin
sugar
cocoa
palm oil
vitamins
minerals
flavours
Chocolate powder 2
sugar
cacao
lecithin
flavours
vitamins
minerals
Nutrition milk powder (Infant formula)
skim milk powder
fat and/or oil
maltodextrin Table 1 indicates the heat treatment conditions to which the powders have been submitted. For each powder, the heat treatment time length was defined in order to avoid any undesired reactions or physical change of the powder.

TABLE 1

| | Heat treatment time (s) | Powder amount (g) |
|---|---|---|
| Chocolate powder 1 | 15 | 20 |
| Chocolate powder 1 | 60 | 15 |
| Nutrition milk powder | 30 | 20 |

Table 2 indicates the reconstitution time $t_{80}$ necessary to get 80% solids of the initial amount of powder dissolved. This value has been calculated from the measurement of the conductivity of the beverage; the conductivity measurement starting from the moment at which the powder is dispensed in the water.

TABLE 2

| | $t_{80}$ without heat treatment | $t_{80}$ with heat treatment |
|---|---|---|
| Chocolate powder 1 | 427 | 81 |
| Chocolate powder 1 | 17 | 7 |
| Nutrition milk powder | 186 | 7 |

This example reflects that a short heating of the powders prior to their reconstitution in water results in significantly shorter dissolution time, even if the temperature of the reconstitution water is 5° C., for which reconstitution issues are usually observed.

Example 2

The following example was done with the same chocolate powder 1 as in example 1. The powder was submitted to the same heating treatment as defined in Table 1 but the powder was stored during 6 weeks before its dissolution was measured in the same conditions as in Example 1 (200 ml of water at 5° C.). In this case, the result was even worse than for the original chocolate powder 1 that hasn't been submitted to any heat treatment.

TABLE 3

|  | $t_{80}$ without heat treatment (s) | $t_{80}$ with heat treatment (s) and immediate dissolution | $t_{80}$ with heat treatment (s) and dissolution after 6 weeks storage |
|---|---|---|---|
| Chocolate powder 1 | 17 | 7 | 18 |

The invention claimed is:

1. Method for preparing a beverage from a soluble beverage powder in a beverage dispenser, the method comprising the steps of:
   metering a dose of the soluble beverage powder;
   heating the soluble beverage powder dose; and
   dissolving the heated soluble beverage powder dose with a diluent having a temperature between 4 and 10° C. wherein the soluble beverage powder is dosed in a container and the beverage powder dose is heated inside the container; and wherein the heated soluble beverage powder dose is dissolved less than 5 minutes after it has been heated.

2. Method according to claim 1, wherein the heated soluble beverage powder dose is dissolved immediately after it has been heated.

3. Method according to claim 1, wherein the soluble beverage powder dose is heated by applying an electromagnetic energy in a microwave range.

4. Method according to claim 1, wherein the soluble beverage powder is selected from the group consisting of coffee, tea, chocolate, malted beverages, soup, infant formula, milk, creamer and cappuccino powder.

5. Method according to claim 1, wherein the container is selected from the group consisting of cup and a mixing chamber.

6. Method according to claim 1, wherein the container is a capsule.

* * * * *